(12) United States Patent
Borthakur et al.

(10) Patent No.: US 8,751,897 B2
(45) Date of Patent: *Jun. 10, 2014

(54) DISTRIBUTED SYSTEM FOR FAULT-TOLERANT DATA STORAGE

(71) Applicant: Facebook, Inc., Menlo Park, CA (US)

(72) Inventors: Dhrubajyoti Borthakur, Sunnyvale, CA (US); Per Brashers, Oakland, CA (US); Jason Matthew Taylor, Berkeley, CA (US)

(73) Assignee: Facebook Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/057,394

(22) Filed: Oct. 18, 2013

(65) Prior Publication Data

US 2014/0047266 A1  Feb. 13, 2014

Related U.S. Application Data

(63) Continuation of application No. 13/456,102, filed on Apr. 25, 2012, now Pat. No. 8,595,586.

(51) Int. Cl.
*H03M 13/00* (2006.01)

(52) U.S. Cl.
USPC .......................... 714/755; 714/770

(58) Field of Classification Search
USPC .......................... 714/763, 764, 768, 755, 770
See application file for complete search history.

(56) References Cited

U.S. PATENT DOCUMENTS

| | | | | | |
|---|---|---|---|---|---|
| 5,533,036 | A | * | 7/1996 | Blake et al. ................ | 714/763 |
| 5,682,394 | A | * | 10/1997 | Blake et al. ................ | 714/763 |
| 6,247,156 | B1 | * | 6/2001 | Kim ........................... | 714/755 |
| 6,438,727 | B2 | * | 8/2002 | Kim ........................... | 714/764 |
| 7,418,620 | B1 | * | 8/2008 | Tormasov et al. .......... | 714/6.24 |
| 7,853,857 | B2 | * | 12/2010 | Buckley et al. ............. | 714/781 |
| 8,464,133 | B2 | * | 6/2013 | Grube et al. ................ | 714/768 |
| 2010/0287441 | A1 | * | 11/2010 | Seo et al. ................... | 714/755 |

* cited by examiner

*Primary Examiner* — David Ton
(74) *Attorney, Agent, or Firm* — Fenwick & West LLP

(57) ABSTRACT

Fault-tolerant storage is provided using a distributed data storage system that receives input data from clients and divides that data into data blocks for storage. The data blocks are processed using a coding scheme that generates redundant level one error correction blocks (L1EC Blocks). The L1EC blocks enable the reconstruction of one or more damaged or inaccessible data blocks, and the L1EC blocks and the data blocks are divided into distribution sets and stored at a plurality of data storage locations. At each data storage location additional level two error correction blocks (L2EC blocks) are generated that provide local data redundancy. Upon detecting a data disruption event, an inaccessible data storage location is identified and the elements that were stored at the inaccessible data storage location are reconstructed.

20 Claims, 6 Drawing Sheets

DISTRIBUTED SYSTEM FOR FAULT-TOLERANT DATA STORAGE

CROSS-REFERENCE TO RELATED APPLICATIONS

The present application is a continuation of U.S. patent application serial no. 13/456,102 filed on Apr. 25, 2012, titled "Distributed System for Fault-Tolerant Data Storage," which issued on Nov. 26, 2013 as U.S. Pat. No. 8,595,586, the content of which is hereby incorporated by reference.

BACKGROUND

This invention relates generally to data storage technologies, in particular, to distributed fault-tolerant storage in independent storage locations.

Modern Internet-scale applications, such as social networking websites, receive and generate vast quantities of data continuously. This data includes user information, images, videos, text posts, emails, performance logs, search indices, meta data, etc. This data must be stored securely and reliably, and it must be accessible despite data disruption events such as natural disasters, power failures, disk failures, server failures, etc. In the past, reliability and accessibility of data in Internet applications was provided by storing many copies of the same data in geographically separate data centers. By having distinct, separate copies of the same data in multiple locations, a system could ensure that at least one copy of the data was accessible at any time, despite the occurrence of data disruption events.

But data mirroring has a cost associated with it. Each copy of data requires additional storage resources, and if multiple copies of the same data are maintained, the storage overhead becomes prohibitive for large data sets. One solution to this problem is to not maintain full redundant copies of the data, but rather to compute smaller recovery codes from the data, where the recovery codes allow a lost piece of the data to be recovered using the remaining data. In the simplest case a recovery code can be generated by splitting the data into N pieces and computing an XOR across the pieces. The N pieces of data can then be distributed to N separate data storage locations. If any one of the N pieces is lost, the lost piece can be reconstructed by XORing the recovery code against the remaining pieces. In this simple case the storage scheme requires 1/N of the data as additional storage overhead to maintain the recovery codes, but this is still an improvement over the complete data duplication required in data mirroring. The simple scheme guards against the loss of only a single one of the N pieces of data, however, other methods of generating recovery codes allow for greater redundancy, but may require additional storage overhead as a tradeoff. The data storage locations can be established in geographically separate sites so that the probability of a single data disruption event effecting all locations is minimized.

Systems that provide redundant storage as described above are sometimes called Reliable Arrays of Independent Nodes (RAIN). RAIN systems are often efficient in terms of the storage overhead that they require to provide data redundancy, but they are inefficient in terms of the network usage. When a piece of data is lost at one of the nodes of a RAIN system due to a data disruption event (e.g., hard disk failure), the information to reconstruct that lost data must be fetched from other nodes since all the recovery codes and the other data pieces will not be locally stored. The RAIN system cannot keep all the recovery codes and other data pieces locally because doing so would adversely affect the fault-tolerance characteristics of the system—the failure of a single machine or location could cause the system to lose access to all the locally stored data. Therefore, when data recovery is necessary, both the recovery codes and data pieces necessary for data reconstruction must be sent over the network to the location where the lost data is being reconstructed.

Depending on the frequency and severity of data disruption events, the network traffic initiated by data reconstruction processes may cause network congestion and other issues. For extremely large data sets, such as those generated by Internet scale applications—e.g. social networking systems, search engines, web services providers, etc.—handling the traffic between data storage locations may be very expensive.

SUMMARY

Embodiments of the invention provide fault-tolerant storage for systems that use large data sets stored across a distributed storage system. In one embodiment, input data is received from clients and the received data is divided into data blocks for storage. The data blocks are processed using a coding scheme that generates redundant level one error correction blocks (L1EC Blocks). The L1EC blocks enable the reconstruction of one or more damaged or inaccessible data blocks, so long as sufficient undamaged elements are still accessible. The L1EC blocks and the data blocks are divided into distribution sets and these sets are stored at a plurality of data storage locations. At each data storage location, additional level two error correction blocks (L2EC blocks) are generated that provide local data redundancy. The L2EC blocks enable reconstruction of damaged elements at a data storage location without requiring communication with the other data storage locations. Upon detecting a data disruption event, an inaccessible data storage location is identified and the elements that were stored at the inaccessible data storage location are reconstructed.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A distributed data storage system (DDSS) receives data from clients and computes a first level of error correction codes for this data at a global level. The first level error correction codes and the data are distributed to a number of data storage locations. At the data storage locations a second level of local error correction codes are computed. If a data storage location becomes inaccessible due to a data disruption event, the global error correction codes and the data available at the other data storage locations is sufficient to reconstruct the data stored at the now inaccessible data storage location. If a local data disruption event occurs, the local error correction codes are used to reconstruct the data locally, minimizing the network communication necessary to recover from the disruption event.

System Overview

Figure 1:
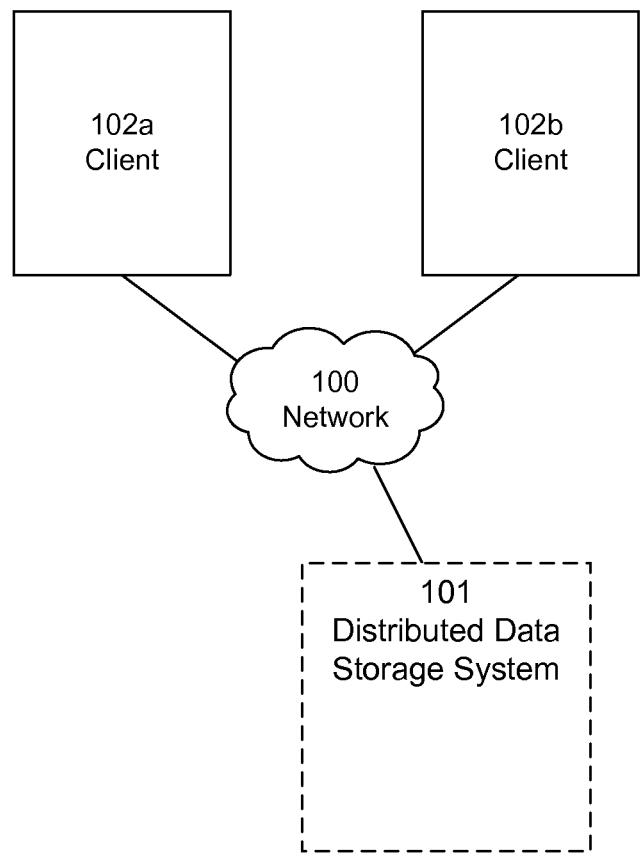
FIG. 1 is a figure illustrating one example embodiment of a distributed data storage system connected to clients in a network environment.

FIG. 1 illustrates one example embodiment of a DDSS 101 connected to clients 102 in a networked environment. The clients 102 communicate with the DDSS 101 through the network 100.

The network 100 enables communications between the clients 102 and the DDSS 101. In one embodiment, the network 100 uses standard communications technologies and/or protocols. Thus, the network 100 can include links using technologies such as Ethernet, 802.11, worldwide interoperability for microwave access (WiMAX), 3G, 4G, LTE, digital subscriber line (DSL), asynchronous transfer mode (ATM), InfiniBand, PCI Express Advanced Switching, etc. In one embodiment the network 100 is the Internet.

The clients 102 may be any computer system that produces data that requires reliable storage. The clients 102 may be, for example, servers, such as those hosting Internet applications or providing data processing, or user clients, such as mobile phones, PCs, tablet computers, etc. The clients 102 generate data that is sent to the DDSS 101 for storage. The clients 102 may also request data from the DDSS 101.

The DDSS 101 receives data from clients 102 and stores this data in a reliable and fault-tolerant manner. The DDSS 101 also receives requests for data from the clients 102, and responds to these requests by providing the requested data.

Distributed Data Storage System Details

Figure 2:
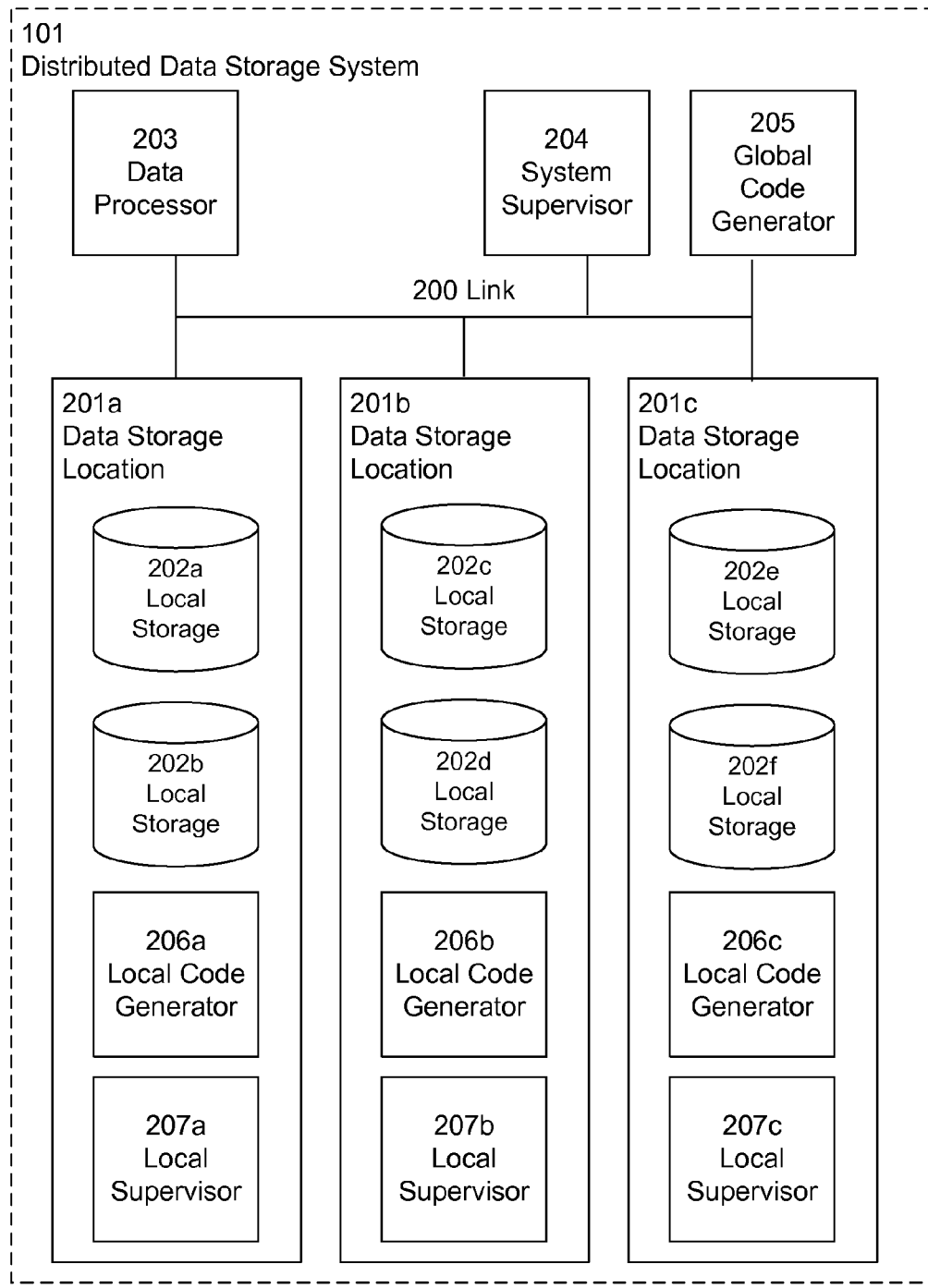
FIG. 2 illustrates the components of a distributed data storage system in one example embodiment.

FIG. 2 illustrates the components of a DDSS 101. In one embodiment the DDSS 101 is composed of several components that communicate via a link 200. The components include the data processor 203, the system supervisor 204, the global code generator 205, and the data storage locations 201. These components may themselves be distributed systems that execute on two or more computer server systems. For example, the data processor 203 may consist of computer software executing on a cluster of computer servers executing in one or more data centers. Although the components may be implemented on distinct computer hardware and may be physically located in geographically separated locations, some components may be located at the same location and may even run on the same computer hardware. For example, in one embodiment, the data processor 203, the system supervisor 204, and the global code generator 205 may be software modules that execute on the same computer server, or on the same cluster of computer servers.

The link 200 is a communications network that enables communications between the components of the DDSS 101. The link 200 may be implemented as a separate physical network, or the link 200 may be an existing network such as the Internet. In one embodiment the link 200 is the same as the network 100. In another embodiment the link 200 is implemented as a virtual network on top of the network 100. If the link 200 is a separate network or a virtual network it may provide additional benefits as compared to the network 100, such as encryption, superior speed, superior reliability, etc. In the case where multiple components of the DDSS 101 execute on the same hardware, the communication between the components may be conducted over high speed internal buses instead of the link 200.

The data processor 203 receives input data from the clients 102 and splits the data into data blocks. These data blocks contain the information in the input data. The data blocks need not be a fixed size, but using fixed sized data blocks may simplify the downstream processing done by the DDSS 101. The size of the data blocks is also variable. The size can be determined based on the characteristics of the link 200, the data storage locations 201, and/or the network 100.

The global code generator 205 computes L1EC blocks using the data blocks. The L1EC blocks are error correction codes that provide redundancy information that makes it possible to reconstruct a damaged or missing data block using the remaining data blocks. The L1EC blocks may be computed from the data blocks using different techniques. In one example embodiment the global code generator 205 generates the L1EC blocks using ReedSolomon encoding (RS encoding). Other encoding schemes may also be used, for example Merkel Tree encoding or Parity-Bit encoding.

The system supervisor 204 is a module that monitors the DDSS 101 and manages data storage, data access, data distribution, data transport, and data recovery processes. The system supervisor 204 may also monitor and manage other processes not mentioned above. The system supervisor 204 tracks the data blocks generated by the data processor 203 and the L1EC blocks generated by the global code generator 205, and maintains the information necessary to reconstruct the input data from the data blocks. The system supervisor 204 is responsible for organizing the storage of the data blocks and L1EC blocks such that the redundancy and fault-tolerance of the DDSS 101 is maintained at an adequate level. To ensure data redundancy the system supervisor 204 distributes the data blocks and L1EC blocks for storage at the independent data storage locations 201 such that one or more data storage locations 201 may fail without compromising the ability of the DDSS 101 to reconstruct the data. The system supervisor 204 detects the occurrence of data disruption events at the data storage locations 201 and initiates data recovery and reconstruction processes to enable access to the lost or damaged data. In one embodiment the system supervisor 204 monitors the health of the data storage locations 201 actively by executing monitoring processes at each location. In another embodiment the system supervisor 204 monitors the data storage locations 201 passively by receiving communication from the data storage locations 201 and/or the clients 102. When DDSS 101 receives a request for data from a client 102, the system supervisor 204 will determine the location of the data blocks necessary to reconstruct the requested data. The system supervisor 204 may reconstruct the requested data from the data blocks and send the data to the requestor, or it may send references to the data storage locations 201 where the data blocks are located to the requestor. The requestor may then receive the data blocks directly from the data storage locations 201 and may reconstruct the data itself.

The data storage locations 201 are systems that provide storage resources to the DDSS 101. In one embodiment the data storage locations 201 are single computer storage servers located at different physical locations. In another embodiment the data storage locations 201 are entire data centers located in different geographical locations. Each data storage location 201 may have multiple local storage resources 202. In the case where the data storage location is a single computer system, the local storage resources 202 may be individual storage drives. In the case where the data storage location 201 is an entire data center, the local storage resources 202 may be independent storage servers. Each data storage location 201 includes a local code generator 205. The local code generator 206 is a module that computes L2EC blocks using the data blocks and L1EC blocks (collectively called "elements" or "blocks") located at that data storage location 201. The L2EC blocks are error correction codes that provide redundancy information that makes it possible to reconstruct damaged or missing elements using the remaining elements at the same data storage location 201. Just as the L1EC blocks may be generated using different coding techniques, the L2EC blocks may be computed from elements using different techniques. RS encoding may be used to generate the L2EC blocks as well as the L1EC blocks, or different techniques may be used for the L2EC and L1EC blocks. In one embodiment the local code generator 206 is a module executed locally at the data storage location 201. In another embodiment the local code generator 206 is a remote process controlled by the global code generator 205 or the system supervisor 204. Each data storage location 201 also includes a local supervisor 207 that monitors the health of the local storage resources 202 and initiates a recovery process if necessary. The local supervisor 207 may also respond to requests for data from clients 102 by sending individual data blocks (or input data that has been reconstructed from the data blocks) directly to the client 102. In one embodiment the local supervisor 207 is a locally executing module of the system supervisor 204.

The embodiment described in detail above, and in the remainder of this document, illustrates a two level example of the system. However, the error correction blocks can be generated for more than two levels of hierarchy. For example, after the generation of the L2EC codes and the distribution to local storage resources 202, a third level of error correction blocks, L3EC blocks may be computed from the data blocks, L1EC blocks, and L2EC blocks. These blocks and the generated L3EC blocks may then be further distributed to sub-storage resources of the local storage resources 202 (if the local storage resources 202 are storage servers, for example, the sub-storage resources may be individual hard disks). Similarly if there are more levels of independent storage, further L4EC blocks, L5EC blocks, etc., may be generated.

Storage Process Details

Figure 3A:
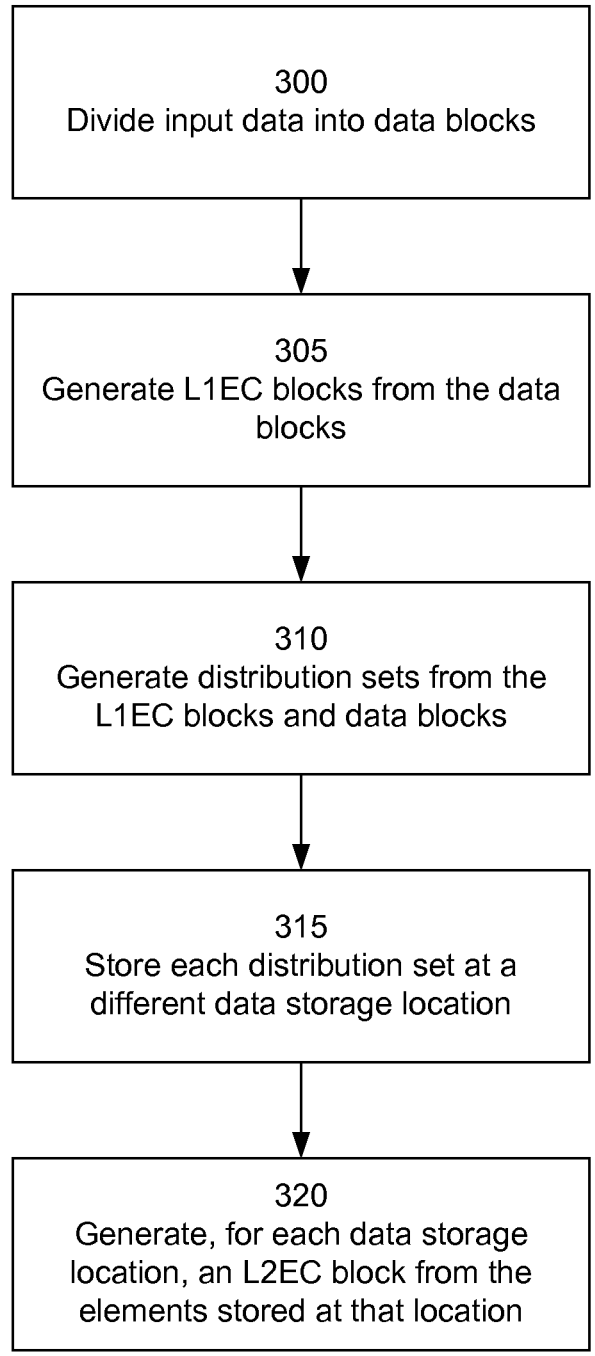
FIG. 3A illustrates an example process for processing and storing data, to enable data recovery, in a distributed data storage system.

FIG. 3A illustrates an example process for storing data, to enable data recovery, in a DDSS 101. When the DDSS 101 receives input data requiring storage, the data processor 203 first divides 300 the input data into data blocks. In one embodiment these data blocks are of uniform size to simplify further processing and monitoring. In another embodiment the data blocks may be of non-uniform size. The data blocks contain the information from the input data, and though the data blocks may be stored separately, the input data may be reconstructed using the data blocks. The number of data blocks generated from the input data depends on the size of the input data and the size limit imposed on the data blocks by the DDSS 101. In one embodiment, the size of the data blocks may be determined based on the characteristics of the network 101 and the link 200, as well as the characteristics of the storage resources of the data storage locations 201.

Once the data blocks have been generated, the global code generator 205 generates L1EC blocks from the data blocks. The number of L1EC blocks generated from the data blocks depends on the number of data blocks and the level of redundancy that administrators have determined is necessary in the system. In general, generating more L1EC blocks for a given set of data blocks provides more redundancy. Increased redundancy allows for more blocks to be lost or damaged before data recovery becomes impossible. Selecting an appropriate technique for generating the L1EC blocks may also provide additional redundancy. In one example embodiment RS encoding provides a good balance between redundancy and other factors such as encoding efficiency.

Once the L1EC blocks have been computed, distribution sets are generated 310. The distribution sets each contain one or more elements—data blocks and/or L1EC blocks—that can be safely stored at a single data storage location 201. The purpose of dividing the elements into distribution sets is to ensure that no single data storage location contains a critical amount of data. A critical amount of data is an amount of data that when lost makes data recovery of the input data impossible. The system is designed such that any of the distribution sets can be completely lost to a data disruption event without compromising access to the input data. The size and number of the distribution sets will depend on the redundancy provided by the L1EC encoding scheme and the number of data storage locations 201 available. In general, the greater the redundancy provided by the L1EC blocks, the more elements that can be included in a single distribution set. If the L1EC blocks provide poor redundancy, then the distribution sets can only contain a few elements. For example, if only a single L1EC block is generated from the data blocks using an XOR coding scheme, then there will be only a single element of redundancy (i.e. if more than one element is lost the input data cannot be reconstructed). In this example, the distribution sets can only contain a single element each (i.e. only a single L1EC block or data block). The number of data storage locations 201 acts as a cap on the number of distribution sets that may be generated. Since the same data storage location 201 may not store more than one distribution set—because the loss of two distribution sets at one location would lead to permanent data loss—a given set of data blocks and the L1EC blocks generated from them may not be put in more distribution sets than there are data storage locations 201. However, as new input data is processed by the system, and new L1EC codes are generated for the new input data, these new elements may be put into new distribution sets that are distributed onto existing data storage locations 201. This is because the redundancy of separately processed input data does not overlap. In addition, the system may be designed to function through the loss of more than one data storage location 201 by further reducing the number of elements in each distribution set below the critical data level. For example, if the system administrators wish to allow the DDSS 101 to preserve data in the event of the loss of two data storage locations 201, only a half of a critical amount of data may be included in each distribution set. By doing so the loss of any two data locations will not result in the loss of a critical amount of data (since each data storage location in this example contains at most one distribution set, which is half of a critical amount of data).

Once the distribution sets are generated, each distribution set is stored 315 at a separate data storage location 201—i.e. all the elements of a single distribution set are stored at the same data storage location 201, and no two distribution sets have elements at the same data storage location 201. The DDSS 101 will have an L1EC encoding scheme and enough data storage locations 201 such that each distribution set can be stored at a separate location. As the system receives more input data, the distribution sets for this new input data will also be stored at the data storage locations. Thus, while a single data storage location 201 will include multiple distribution sets, these distribution sets will be from different input data. Thus if a single data storage location 201 becomes inaccessible, a critical amount of data will not be lost for any of the input data received by the DDSS 101.

At each data storage location, L2EC blocks are generated 320 from the elements stored at that location using the local code generator 206. The L2EC blocks will thus be generated from elements from multiple distribution sets, but these distribution sets will be from different input data. The L2EC blocks are generated from the elements (including both data blocks and L1EC blocks) in a manner that is analogous to how L1EC blocks are generated from data blocks. Similar factors influence the selection of the coding scheme used to generate the L2EC blocks, and the redundancy provided by the L2EC blocks is similarly dependent on the number of elements at the data storage location 201 and the number of L2EC blocks generated. The L2EC blocks and the other elements at a data storage location 201 may be distributed across the local storage resources 202 at that location in a way that attempts to minimize the risk of data loss associated with a data disruption event at a single local storage resource 202 (e.g. disk failure).

Figure 3B:
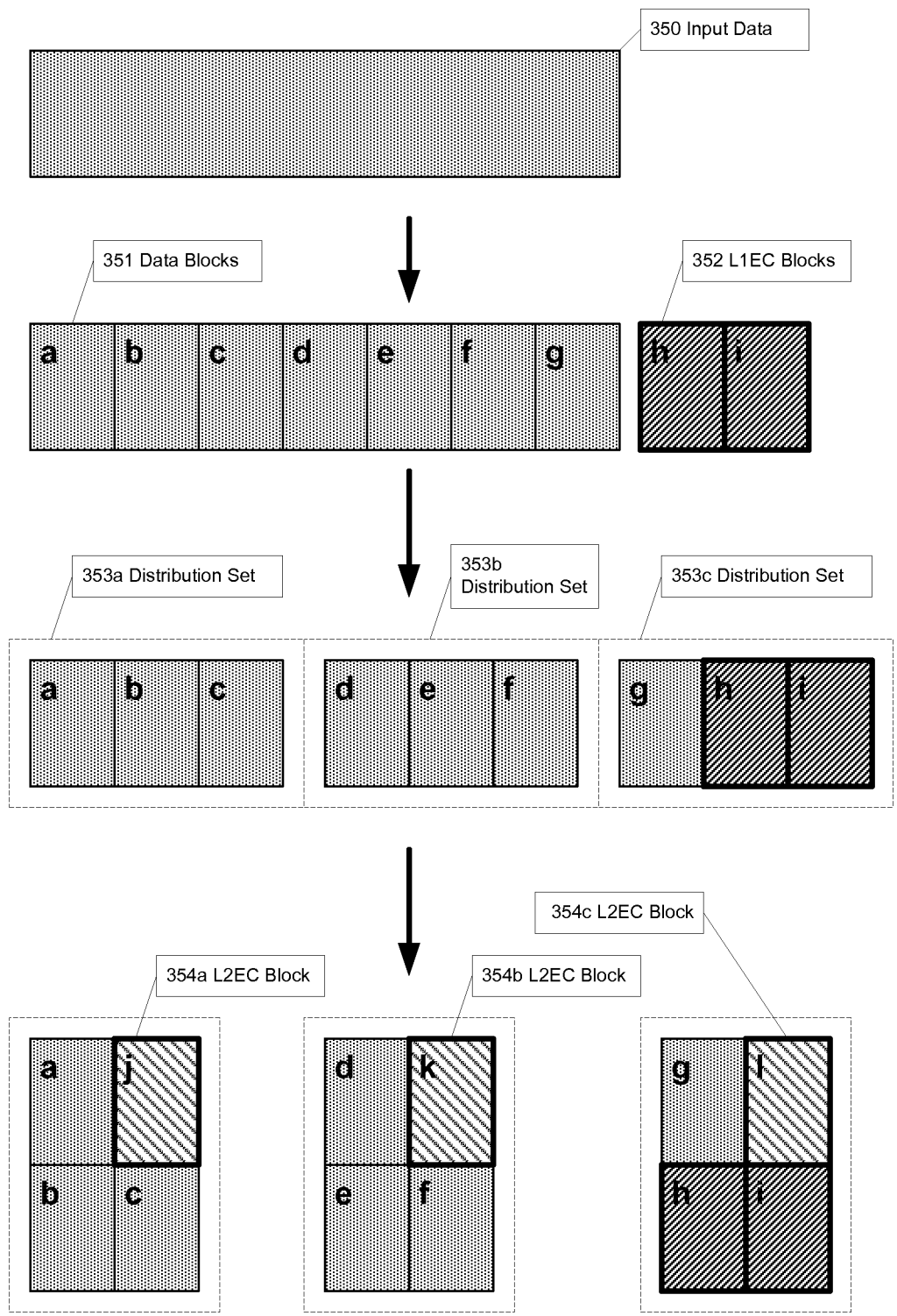
FIG. 3B illustrates an embodiment of the data structures that are created at various stages in the course of data storage in a distributed data storage system.

FIG. 3B illustrates one embodiment of the data that may be created in the course of the data storage process illustrated in FIG. 3A. The input data 350 is received by the DDSS 101. The input data 350 is divided into data blocks 351, here labeled a, b, c, d, e, f, and g. L1EC blocks 352 are generated based on the data blocks 351. Here the L1EC blocks are labeled h and i. Next the blocks are divided into distribution sets 353. In this example there are three distribution sets with three blocks in each, but in other embodiments there may be different numbers of blocks in each distribution set. The distribution blocks are then stored at the data storage locations, and L2EC blocks 354 are generated based on the data at each data storage location. Here the L2EC blocks are labeled j, k, and l. In this figure the layout of the data blocks, L1EC blocks, and L2EC blocks is merely cosmetic. The logical and physical arrangement of data in the actual storage media can be in any appropriate layout or scheme (e.g. striping, blocking, etc.)

Data Recovery Process Details

Figure 4:
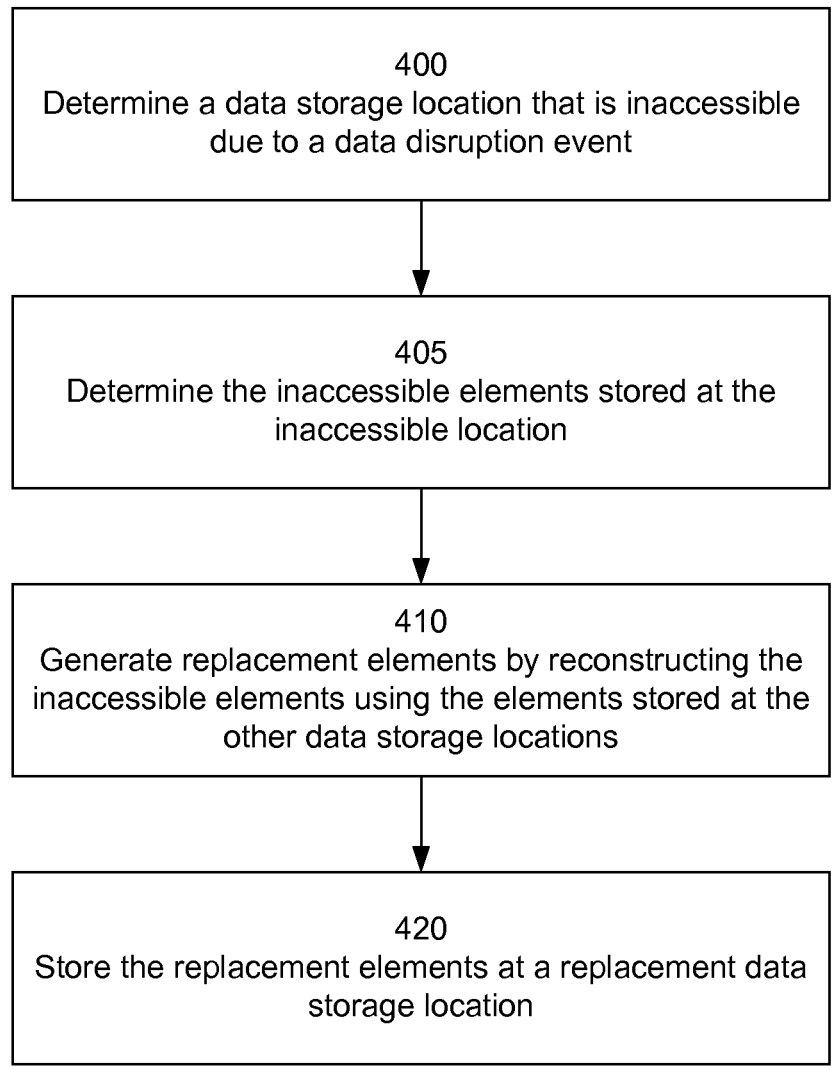
FIG. 4 illustrates a process for recovering from a data disruption event that makes an entire data storage location inaccessible.

FIG. 4 illustrates a process for recovering from a data disruption event that makes an entire data storage location 201 inaccessible. If the data storage locations 201 are entire data centers, the data disruption events of this scale are also of larger scale, for example, natural disasters, blackouts, severe network failures, etc. If the data storage locations 201 are of smaller scale, the data disruption events that cause inaccessibility may also be of smaller size, such as local power failures, equipment fires, etc.

In the first step of the recovery process the system supervisor 204 determines 400 a data storage location 201 that is inaccessible. The system supervisor 204 may make this determination by periodically monitoring each data storage location 201, by receiving notification from the local supervisor 207 or another local process, by notification from an administrator, or by some other means. Once the inaccessible location is identified, the system supervisor 204 will determine 405 the inaccessible elements located at that data storage location 201. Different methods may be used to determine the inaccessible elements. In one embodiment the inaccessible elements are determined using a directory maintained by the system supervisor 204 that tracks the storage location of each element in the DDSS 101.

Once the inaccessible elements are determined, replacement elements are generated 410 by the system supervisor 204. The replacement elements are generated using the other elements of the same input data that were stored at other data storage locations 201, taking advantage of the redundancy provided by the L1EC blocks. Because less than a critical amount of data for each input is stored at each data storage location 201, by using the remaining elements—the L1EC blocks and data blocks stored at the still accessible data storage locations 201—replacement elements can be generated using a suitable decoder. For example, if the L1EC blocks were generated using RS encoding, they are decoded using an ReedSolomon decoder.

The replacement elements may be stored 420 at one or more replacement data storage locations. These replacement data storage locations may just be the existing data storage locations 201, or they may be data storage locations that have been held in reserve to serve as replacements for failed data storage locations.

Figure 5:
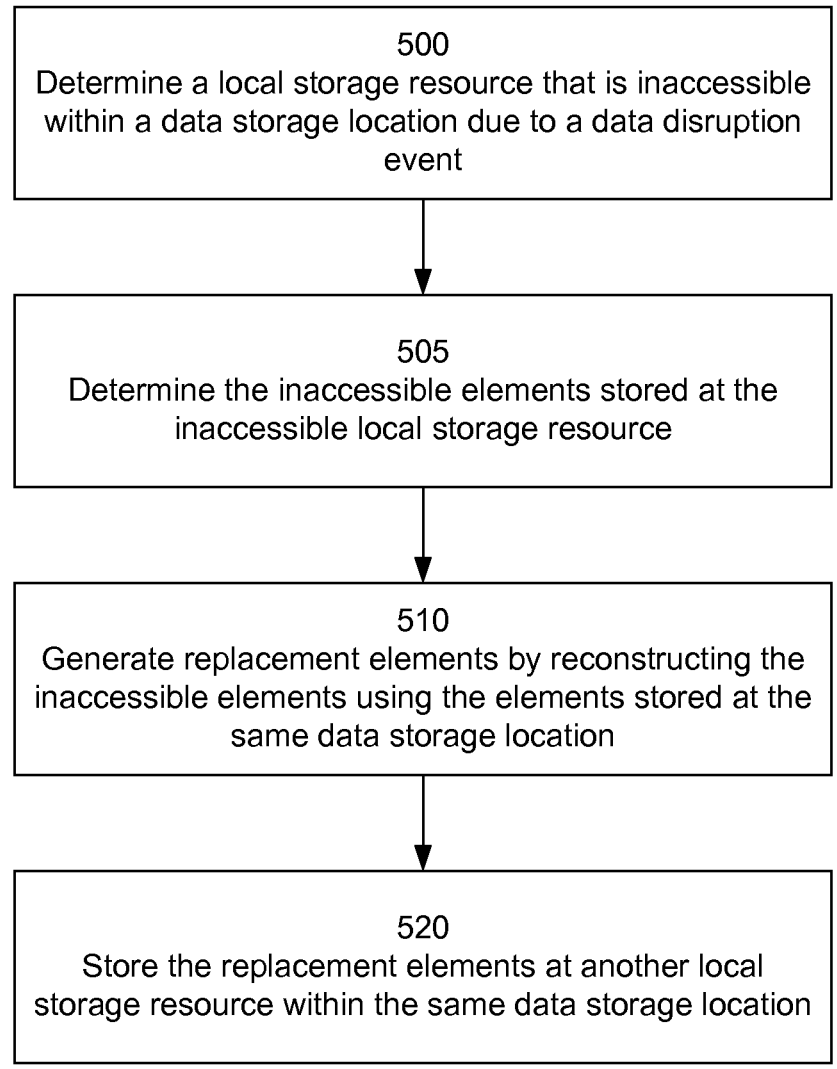
FIG. 5 illustrates a process for recovering from a data disruption event that makes a local storage resource inaccessible.

FIG. 5 illustrates a process for recovering from a data disruption event that makes a local storage resource inaccessible. If the data storage locations 201 are entire data centers, the data disruption events of this scale will include local disruptions, for example, disk failures, server failures, power failures, etc.

In the first step of the recovery process the local supervisor module 207 determines 500 a local storage resource 202 that is inaccessible or damaged. Once the inaccessible or damaged storage resource is identified, the local supervisor 207 will determine 505 the inaccessible or damaged elements located at that local storage resource. Different methods may be used to determine the inaccessible elements. In one embodiment the inaccessible elements are determined using a directory maintained by the local supervisor 207 that tracks the storage place of each element in that data storage location 201.

Once the inaccessible elements are determined, replacement elements are generated 510 by the local supervisor 207. The replacement elements are generated using the other elements that are stored at the same data storage locations 201 using the redundancy provided by the L2EC blocks at that location. If the amount of data lost at the damaged local storage is a critical amount such that recovery is not possible using the redundancy provided by the L2EC blocks, then the local supervisor 207 may send a request to the system supervisor 204 for at least some of the missing data. The system supervisor 204 will coordinate the reconstruction of the requested data and will send this data to the data storage location 201 where the local disruption occurred. When the local supervisor 207 receives this data it will have enough information to proceed with the remainder of the reconstruction locally—i.e. a critical amount of data will no longer be missing and reconstruction using the L2EC provided redundancy will be possible. If the amount of local data lost is too large for local reconstruction to occur, then the L1EC blocks and data blocks at other data storage locations 201 may be used to completely reconstruct the damaged data storage location 201.

The reconstruction of the missing local elements is similar to the decoding process described above, the only difference being that the L2EC redundancy is exploited for this reconstruction, whereas in the previous level of reconstruction L1EC redundancy is utilized. The decoders used for L2EC decoding may be the same, or may be different from the decoders used for L1EC decoding. Once reconstruction of the replacement elements is completed, the elements may be stored 520 at another local storage resource within the same data storage location.

Practical Concerns

In some embodiments, the modules of the DDSS 101 are not contained within a single networking system but are found across several such systems. The DDSS 101 may communicate with the other systems, for example, using APIs. In these embodiments, some modules shown in FIG. 2 may run in the DDSS 101, whereas other modules may run in the other systems. For example, in one embodiment the data storage location 201, may run on some external networked database system outside the DDSS 101.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   storing each of a plurality of distribution sets at a different one of a plurality of data storage locations, each distribution set comprising one or more elements, each element selected from a plurality of data blocks comprising a portion of input data or a plurality of level one error correction blocks (L1EC blocks) generated from the plurality of data blocks, the L1EC blocks comprising recovery information so that a damaged one of the data blocks is recoverable from one or more of the L1EC blocks and one or more of the plurality of data blocks other than the damaged data block;
   detecting a data disruption event;
   identifying an inaccessible data storage location in the plurality of data storage locations; and
   reconstructing the elements that were stored at the inaccessible data storage location using the elements stored at one or more of the plurality of data storage locations other than the inaccessible data storage location.

2. The method of claim 1, wherein the inaccessible data storage location comprises an inaccessible local storage resource at the data storage location, and wherein the reconstructing the elements that were stored at the inaccessible data storage location comprises reconstructing the elements that were stored at the inaccessible local storage resource using the elements stored at one or more of the plurality of local storage resources other than the inaccessible local storage resource.

3. The method of claim 1, wherein reconstructing the elements further comprises:
   using a directory maintained by a system supervisor to determine the elements that were stored at the inaccessible data storage location.

4. The method of claim 1, wherein at least one of the plurality of data storage locations further comprises a plurality of local storage resources comprising elements stored at the at least one data storage location.

5. The method of claim 1, wherein no distribution set contains a critical amount of data.

6. The method of claim 1, further comprising:
   receiving the input data;
   dividing the input data into the plurality of data blocks;
   generating the plurality of L1EC blocks from the plurality of data blocks; and
   generating the plurality of distribution sets.

7. The method of claim 6, further comprising:
   generating, for each data storage location, a level two error correction block (L2EC block) from two or more of the elements stored at that data storage location, the L2EC blocks comprising recovery information so that a damaged one of the elements at that data storage location is recoverable from one or more of the L2EC blocks and one or more of the plurality of elements at that data storage location other than the damaged element.

8. A system comprising:
   a computer processor; and
   a non-transitory computer-readable storage medium containing computer instructions executable by the computer processor for:
      storing each of a plurality of distribution sets at a different one of a plurality of data storage locations, each distribution set comprising one or more elements, each element selected from a plurality of data blocks comprising a portion of input data or a plurality of level one error correction blocks (L1EC blocks) generated from the plurality of data blocks, the L1EC blocks comprising recovery information so that a damaged one of the data blocks is recoverable from one or more of the L1EC blocks and one or more of the plurality of data blocks other than the damaged data block;
      detecting a data disruption event;
      identifying an inaccessible data storage location in the plurality of data storage locations; and
      reconstructing the elements that were stored at the inaccessible data storage location using the elements stored at one or more of the plurality of data storage locations other than the inaccessible data storage location.

9. The system of claim 8, wherein the inaccessible data storage location comprises an inaccessible local storage resource at the data storage location, and wherein the reconstructing the elements that were stored at the inaccessible data storage location comprises reconstructing the elements that were stored at the inaccessible local storage resource using the elements stored at one or more of the plurality of local storage resources other than the inaccessible local storage resource.

10. The system of claim 8, wherein reconstructing the elements further comprises:
    using a directory maintained by a system supervisor to determine the elements that were stored at the inaccessible data storage location.

11. The system of claim 8, wherein at least one of the plurality of data storage locations further comprises a plurality of local storage resources comprising elements stored at the at least one data storage location.

12. The system of claim 8, wherein no distribution set contains a critical amount of data.

13. The system of claim 8, further comprising computer instructions for:
    receiving the input data;
    dividing the input data into the plurality of data blocks;
    generating the plurality of L1EC blocks from the plurality of data blocks; and
    generating the plurality of distribution sets.

14. The system of claim 13, further comprising computer instructions for:
    generating, for each data storage location, a level two error correction block (L2EC block) from two or more of the elements stored at that data storage location, the L2EC blocks comprising recovery information so that a damaged one of the elements at that data storage location is recoverable from one or more of the L2EC blocks and one or more of the plurality of elements at that data storage location other than the damaged element.

15. A system comprising:
    a processor;
    a system supervisor configured for storing each of a plurality of distribution sets at a different one of a plurality of data storage locations, each distribution set comprising one or more elements, each element selected from a plurality of data blocks comprising a portion of input data or a plurality of level one error correction blocks (L1EC blocks) generated from the plurality of data blocks, the L1EC blocks comprising recovery information so that a damaged one of the data blocks is recoverable from one or more of the L1EC blocks and one or more of the plurality of data blocks other than the damaged data block;
    the system supervisor further configured for detecting a data disruption event and identifying an inaccessible data storage location in the plurality of data storage locations; and
    a plurality of reconstructing decoders configured for reconstructing the elements that were stored at the inaccessible data storage location using the elements stored at one or more of the plurality of data storage locations other than the inaccessible data storage location.

16. The system of claim 15, wherein the inaccessible data storage location comprises an inaccessible local storage resource at the data storage location, and wherein the reconstructing the elements that were stored at the inaccessible data storage location comprises reconstructing the elements that were stored at the inaccessible local storage resource using the elements stored at one or more of the plurality of local storage resources other than the inaccessible local storage resource.

17. The system of claim 15, wherein the system supervisor is further configured for maintaining a directory used to determine the elements that were stored at the inaccessible data storage location.

18. The system of claim 15, wherein no distribution set contains a critical amount of data.

19. The system of claim 15, wherein:
    the processor is further configured for receiving the input data and dividing the input data into the plurality of data blocks; and the system supervisor is further configured for generating the plurality of distribution sets; and
    further comprising:
        a global code generator configured for generating the plurality of L1EC blocks from the plurality of data blocks.

20. The system of claim 19, further comprising:
    a local code generator configured for generating, for each data storage location, a level two error correction block (L2EC block) from two or more of the elements stored at that data storage location, the L2EC blocks comprising recovery information so that a damaged one of the elements at that data storage location is recoverable from one or more of the L2EC blocks and one or more of the plurality of elements at that data storage location other than the damaged element
    the system supervisor further configured for identifying an inaccessible data storage location in the plurality of data storage locations; and
    the plurality of reconstructing decoders further configured for reconstructing the elements that were stored at the inaccessible data storage location using the elements stored at one or more of the plurality of data storage locations other than the inaccessible data storage location.

* * * * *